(12) United States Patent
Park et al.

(10) Patent No.: US 10,581,560 B2
(45) Date of Patent: Mar. 3, 2020

(54) METHOD OF TRANSCEIVING DATA VIA UPLINK CHANNEL FOR COVERAGE EXPANSION AND APPARATUS THEREOF

(71) Applicant: KT CORPORATION, Gyeonggi-do (KR)

(72) Inventors: Kyujin Park, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/716,568

(22) Filed: Sep. 27, 2017

(65) Prior Publication Data
US 2018/0097584 A1 Apr. 5, 2018

(30) Foreign Application Priority Data

Sep. 30, 2016 (KR) .................. 10-2016-0127089
Jun. 26, 2017 (KR) .................. 10-2017-0080594

(51) Int. Cl.
| H04L 1/18 | (2006.01) |
| H04L 1/08 | (2006.01) |
| H04L 1/00 | (2006.01) |
| H04W 72/04 | (2009.01) |
| H04W 72/08 | (2009.01) |

(52) U.S. Cl.
CPC .......... *H04L 1/1812* (2013.01); *H04L 1/0038* (2013.01); *H04L 1/0046* (2013.01); *H04L 1/08* (2013.01); *H04L 1/1896* (2013.01); *H04W 72/042* (2013.01); *H04W 72/08* (2013.01)

(58) Field of Classification Search
CPC ........... H04W 72/042; H04W 72/0413; H04W 56/0005; H04W 24/10; H04L 5/0053
See application file for complete search history.

(56) References Cited

U.S. PATENT DOCUMENTS

| 2015/0237604 A1* | 8/2015 | Shi ...................... H04W 72/042 |
| | | 370/330 |
| 2016/0269160 A1* | 9/2016 | Noh ...................... H04L 5/0048 |
| 2018/0115387 A1* | 4/2018 | Takeda .................... H04B 7/02 |
| 2018/0213484 A1* | 7/2018 | Oh ........................ H04W 52/42 |

OTHER PUBLICATIONS

Intel Corporation, "Downlink control singaling design for shorten TTI", R1-164160, 3GPP TSG-RAN WG1 #85, Nanjing, China, May 23-27, 2016, pp. 1-5.
Samsung, "sDCI design for sTTI operations", R1-166700, 3GPP TSG RAN WG1 Meeting #86, Gothenburg, Sweden, Aug. 22-26, 2016, pp. 1-4.

* cited by examiner

*Primary Examiner* — Jamal Javaid
(74) *Attorney, Agent, or Firm* — IP Legal Services, LLC (57) ABSTRACT

Provided is a method of transceiving data via an uplink data channel for coverage expansion. The method may include establishing, by a base station, an uplink data channel enhancement mode for uplink data channel coverage enhancement of a user equipment; configuring a first downlink control information (DCI) format for the user equipment set with the uplink data channel enhancement mode; and transmitting the first DCI format via a downlink control channel.

12 Claims, 10 Drawing Sheets

Table 1: PDCCH and PUSCH configured by C-RNTI

| Transmission Mode | DCI format | Search Space | Transmission scheme of PUSCH corresponding to PDCCH |
|---|---|---|---|
| Mode 0 | DCI format 0 | Common and UE specific by C-RNTI | Single-antenna port, port 10 (see subclause 8.0.1) |
| Mode 1 | DCI format 0 | Common and UE specific by C-RNTI | Single-antenna port, port 10 (see subclause 8.0.1) |
| Mode 2 | DCI format 0 | Common and UE specific by C-RNTI | Single-antenna port, port 10 (see subclause 8.0.1) |
| | DCI format 4 | UE specific by C-RNTI | Closed-loop spatial multiplexing (see subclause 8.0.2) |

FIG.1

Table 1: PDCCH and PUSCH configured by C-RNTI

| Transmission Mode | DCI format | Search Space | Transmission scheme of PUSCH corresponding to PDCCH |
|---|---|---|---|
| Mode 0 | DCI format 0 | Common and UE specific by C-RNTI | Single-antenna port, port 10 (see subclause 8.0.1) |
| Mode 1 | DCI format 0 | Common and UE specific by C-RNTI | Single-antenna port, port 10 (see subclause 8.0.1) |
| Mode 2 | DCI format 0 | Common and UE specific by C-RNTI | Single-antenna port, port 10 (see subclause 8.0.1) |
| | DCI format 4 | UE specific by C-RNTI | Closed-loop spatial multiplexing (see subclause 8.0.2) |

FIG.2

Table 1A: EPDCCH and PUSCH configured by C-RNTI

| Transmission mode | DCI format | Search Space | Transmission scheme of PUSCH corresponding to EPDCCH |
|---|---|---|---|
| Mode 0 | DCI format 0 | UE specific by C-RNTI | Single-antenna port, port 10 (see subclause 8.0.1) |
| Mode 1 | DCI format 0 | UE specific by C-RNTI | Single-antenna port, port 10 (see subclause 8.0.1) |
| Mode 2 | DCI format 0 | UE specific by C-RNTI | Single-antenna port, port 10 (see subclause 8.0.1) |
| Mode 2 | DCI format 4 | UE specific by C-RNTI | Closed-loop spatial multiplexing (see subclause 8.0.2) |

FIG.3

*Table 2: PDCCH and PUSCH configured by SPS C-RNTI*

| Transmission mode | DCI format | Search Space | Transmission scheme of PUSCH corresponding to PDCCH |
|---|---|---|---|
| Mode 0 | DCI format 0 | Common and UE specific by C-RNTI | Single-antenna port, port 10 (see subclause 8.0.1) |
| | DCI format N | UE specific by C-RNTI | Single-antenna port, port 10 (see subclause 8.0.1) |
| Mode 1 | DCI format 0 | Common and UE specific by C-RNTI | Single-antenna port, port 10 (see subclause 8.0.1) |
| Mode 2 | DCI format 0 | Common and UE specific by C-RNTI | Single-antenna port, port 10 (see subclause 8.0.1) |

FIG.4

*Table 2A: EPDCCH and PUSCH configured by SPS C-RNTI*

| Transmission mode | DCI format | Search Space | Transmission scheme of PUSCH corresponding to PDCCH |
|---|---|---|---|
| Mode 0 | DCI format 0 | UE specific by C-RNTI | Single-antenna port, port 10 (see subclause 8.0.1) |
| | DCI format N | UE specific by C-RNTI | Single-antenna port, port 10 (see subclause 8.0.1) |
| Mode 1 | DCI format 0 | UE specific by C-RNTI | Single-antenna port, port 10 (see subclause 8.0.1) |
| Mode 2 | DCI format 0 | UE specific by C-RNTI | Single-antenna port, port 10 (see subclause 8.0.1) |

FIG.5

Table 3: PDCCH and PUSCH configured by C-RNTI

| Transmission mode | DCI format | Search Space | Transmission scheme of PUSCH corresponding to PDCCH |
|---|---|---|---|
| Mode 0 | DCI format 0 | Common and UE specific by C-RNTI | Single-antenna port, port 10 (see subclause 8.0.1) |
| | DCI format N | UE specific by C-RNTI | Single-antenna port, port 10 (see subclause 8.0.1) |
| Mode 1 | DCI format 0 | Common and UE specific by C-RNTI | Single-antenna port, port 10 (see subclause 8.0.1) |
| Mode 2 | DCI format 0 | Common and UE specific by C-RNTI | Single-antenna port, port 10 (see subclause 8.0.1) |
| | DCI format 4 | UE specific by C-RNTI | Closed-loop spatial multiplexing (see subclause 8.0.2) |

FIG.6

*Table 3A: EPDCCH and PUSCH configured by C-RNTI*

| Transmission mode | DCI format | Search Space | Transmission scheme of PUSCH corresponding to PDCCH |
|---|---|---|---|
| Mode 0 | DCI format 0 | UE specific by C-RNTI | Single-antenna port, port 10 (see subclause 8.0.1) |
| | DCI format N | UE specific by C-RNTI | Single-antenna port, port 10 (see subclause 8.0.1) |
| Mode 1 | DCI format 0 | UE specific by C-RNTI | Single-antenna port, port 10 (see subclause 8.0.1) |
| Mode 2 | DCI format 0 | UE specific by C-RNTI | Single-antenna port, port 10 (see subclause 8.0.1) |
| | DCI format 4 | UE specific by C-RNTI | Closed-loop spatial multiplexing (see subclause 8.0.2) |

METHOD OF TRANSCEIVING DATA VIA UPLINK CHANNEL FOR COVERAGE EXPANSION AND APPARATUS THEREOF

CROSS REFERENCE TO RELATED APPLICATION

This application claims priority from Korean Patent Application No. 10-2016-0127089, filed on Sep. 30, 2016, and Korean Patent Application No. 10-2017-0080594, filed on Jun. 26, 2017.

BACKGROUND

Field

The present disclosure relates to a method of transceiving data via an uplink channel for providing streaming media, such as audio and video, in a long term evolution (LTE)/LTE-Advanced system.

Description of Related Art

A base station may set one of two types of transmission modes for physical uplink shared channel (PUSCH) transmissions of a typical LTE/LTE-Advanced user equipment. Then, the base station may determine a downlink control information (DCI) format for allocating PUSCH transmission resources depending on the set transmission mode. The UE may perform blind decoding based on the DCI format through a common search space and a UE-specific search space.

In the LTE/LTE-Advanced system, a semi-persistent scheduling (SPS) mechanism is selected to efficiently support real-time media, such as audio and video, which is sensitive to delays. Thus, to receive an SPS activation/deactivation-related DCI, an LTE/LTE-Advanced UE may perform decoding based on a semi-persistent scheduling cell radio network temporary identifier (SPS C-RNTI) allocated thereto in the common search space of a PDCCH or EPD-CCH or in the UE-specific search space.

However, no method has been introduced for setting a transmission mode and performing blind decoding to expand PUSCH coverage of a typical LTE/LTE-Advanced UE set to receive DCI via a physical downlink control channel (PD-CCH) or enhanced physical downlink control channel (EPD-CCH).

SUMMARY OF INVENTION

Various aspects of the present disclosure provide a method for setting a physical uplink shared channel (PUSCH) transmission mode in order for expanding transmission time interval (TTI) bundling and a method for performing blind decoding based on the set transmission mode in order for PUSCH coverage enhancement of a typical LTE/LTE-Advanced user equipment (UE) set to receive downlink control information (DCI) via a physical downlink control channel (PDCCH) or an enhanced physical downlink control channel (EPDCCH).

In an aspect of the present disclosure, provided is a method of transceiving data via an uplink data channel for coverage expansion. The method may include: establishing, by a base station, an uplink data channel enhancement mode for uplink data channel coverage enhancement of a UE; configuring a first downlink control information (DCI) for-mat for the UE set with the uplink data channel enhancement mode; and transmitting the first DCI format via a downlink control channel.

In another aspect of the present disclosure, provided is a method of transceiving data via an uplink data channel for coverage expansion. The method may include: establishing a transmission mode for uplink data channel transmissions; when the transmission mode is an uplink data channel enhancement mode, monitoring a downlink control channel to receive a first downlink control information (DCI) format, and when the transmission mode is an uplink data channel normal mode, monitoring the downlink control channel to receive a second DCI format; and receiving one of the first DCI format and the second DCI format via the downlink control channel.

In another aspect of the present disclosure, provided is a base station for transceiving data via an uplink data channel for coverage expansion. The base station may include: a controller configured to establish an uplink data channel enhancement mode for uplink data channel coverage enhancement of UE and configure a first downlink control information (DCI) format for the UE set with the uplink data channel enhancement mode; and a transmitter configured to transmit the first DCI format via a downlink control channel.

In another aspect of the present disclosure, provided is a UE for transceiving data via an uplink data channel for coverage expansion. The UE may include: a controller configured to establish a transmission mode for transmissions of an uplink data channel, when the transmission mode is an uplink data channel enhancement mode, monitoring a downlink control channel to receive a first downlink control information (DCI) format, and when the transmission mode is an uplink data channel normal mode, monitoring the downlink control channel to receive a second DCI format; and a receiver configured to receive one of the first DCI format and the second DCI format via the downlink control channel.

According to at least one embodiment of the present disclosure, a method for setting a transmission mode and performing blind decoding based on the set transmission may enhance PUSCH coverage of a typical LTE/LTE-Advanced UE.

BRIEF DESCRIPTION OF THE DRAWINGS

The above and other objects, features and advantages of the present disclosure will be more clearly understood from the following detailed description when taken in conjunction with the accompanying drawings, in which.

DETAILED DESCRIPTION

Hereinafter, specific embodiments of the present disclosure will be described in detail with reference to illustrative drawings. Throughout this document, reference should be made to the drawings, in which the same reference numerals and symbols will be used to designate the same or like components. In the following description of the present disclosure, detailed descriptions of known functions and components incorporated herein will be omitted in the case that the subject matter of the present disclosure may be rendered unclear thereby.

Herein, a machine type communications (MTC) user equipment (UE) may refer to a UE supporting a low cost (or low complexity) strategy or a UE supporting coverage enhancement. In addition, herein, the MTC UE may refer to a UE supporting both the low cost (or low complexity) strategy and coverage enhancement. Alternatively, the MTC UE may refer to a UE defined as a specific category for supporting the low cost (or low complexity) strategy and/or coverage enhancement.

In this specification, the MTC UE may refer to a newly-defined 3GPP Release 13 low cost (or low complexity) UE category/type UE performing MTC-related operations based on long-term evolution (LTE). Alternatively, the MTC UE may refer to a UE category/type UE defined in the existing 3GPP Release 12 or previous versions that support improved coverage, compared to conventional LTE coverage or support low-power consumption or a newly-defined Release 13 low cost (or low complexity) UE category/type UE.

Wireless communications systems are widely deployed to provide various communication services, such as a voice service and a data packet service. Such wireless communications systems include a UE and a base station (e.g., evolved node B: eNB). As used in the specification, the term "UE" should be interpreted as having a comprehensive meaning indicating i) a UE in wideband code division multiple access (WCDMA), long-term evolution (LTE), high speed packet access (HSPA), and ii) a mobile station (MS), a user terminal (UT), a subscriber station (SS), and a wireless device in the global system for mobile communications (GSM).

A base station or cell typically refers to a station that communicates with a UE. The base station or cell may also be referred to as a node B, an evolved node B (eNB), a sector, a site, a base transceiver system (BTS), an access point (AP), a relay node, a remote ratio head (RRH), a radio unit (RU), a small cell, or the like.

Hereinafter, the base station or cell should be interpreted as being a comprehensive term indicating a partial area or a function covered by a base station controller (BSC) in code division multiple access (CDMA), a node B in wideband CDMA (WCDMA), an eNB or a sector (or site) in LTE, or the like. In addition, the base station or cell comprehensively indicates a variety of coverage areas, such as a megacell, a macrocell, a microcell, a picocell, a femtocell, and communications ranges of a relay node, an RRH, an RU, and a small cell.

A variety of cells as stated above are controlled by base stations, respectively, which may be interpreted in two senses. Each of the base stations i) may be an apparatus itself that provides a megacell, a macrocell, a microcell, a picocell, a femtocell, or a small cell in relation to a wireless communications area, or ii) may indicate the wireless communications area itself. In i), entire apparatuses providing wireless areas, controlled by the same entity, or entire apparatuses interacting with one another to form a wireless area in a coordinated manner may refer to base stations. An eNB, an RRH, an antenna, an RU, a low power node (LPN), a point, a transceiver point, a transmission point, a reception point, and the like form embodiments of the base station, depending on the configuration of the wireless area. In ii), the wireless area itself in which a signal is received or transmitted may refer to a base station, in terms of a user or an adjacent base station.

Thus, the base station may be referred to as the megacell, the macrocell, the microcell, the picocell, the femtocell, the small cell, the RRH, the antenna, the RU, the LPN, the point, the eNB, the transceiver point, the transmission point, and the reception point.

Herein, the UE and the base station comprehensively refer to two types of transmission/reception entities for realizing technologies or technical concepts described herein and are not limited by terms or words that are explicitly defined. The UE and the base station are comprehensively used as two (uplink or downlink) transmission/reception entities for realizing technologies or technical concepts described herein and are not limited by terms or words that are explicitly defined. Here, the term "uplink (UL)" relates to data transmission/reception in which data is transmitted from the UE to the base station, whereas the term "downlink (DL)" relates to data transmission/reception in which data is transmitted from the base station to the UE.

There are no limitations in multiple access technologies applied to the wireless communications system. For example, A variety of multiple access methods may be used, such as code division multiple access (CDMA), time division multiple access (TDMA), frequency division multiple access (FDMA), orthogonal frequency division multiple access (OFDMA), OFDM-FDMA, OFDM-TDMA, and OFDM-CDMA. Embodiments of the present disclosure may be applicable for the allocation of resources in asynchronous wireless communications evolving into LTE and LTE-Advanced through GSM, WCDMA, and high-speed packet access (HSPA) and synchronous wireless communications evolving into CDMA, CDMA-2000, and ultra mobile broadband (UMB). The present disclosure should not be interpreted as being limited or restricted to a specific field of wireless communications and should be interpreted as covering all technical fields to which the concept of the present disclosure is applicable.

For uplink (UL) transmissions and downlink (DL) transmissions, time division duplexing (TDD) and frequency division duplexing (FDD) may be used. In the TDD, transmission is performed at different fractions of time. In the FDD, a transmission is performed at different frequencies.

In addition, according to standards associated with a LTE or LTE-Advanced systems, a UL and a DL may be formed based on a single carrier wave or a pair of carrier waves. The UL and the DL transmit control information through a control channel, such as a physical downlink control channel (PDCCH), a physical control format indicator channel (PCFICH), a physical hybrid-ARQ indicator channel (PHICH), a physical uplink control channel (PUCCH), and an enhanced physical downlink control channel (EPDCCH). In addition, the UL and the DL are constituted of a data channel, such as a physical downlink shared channel (PDSCH) or a physical uplink shared channel (PUSCH), to transmit data.

In addition, control information can be transmitted using an enhanced or extended PDCCH (EPDCCH).

Herein, the cell may refer to coverage of a signal transmitted from a transmission point or a transmission/reception point, a component carrier having the coverage of the signal transmitted from the transmission point or the transmission/reception point, or the transmission point or the transmission/reception point.

The wireless communications system to which embodiments are applied may be a coordinated multi-point transmission/reception (CoMP) system, in which two or more transmission/reception points transmit a signal in a coordinated manner, a coordinated multi-antenna transmission system, or a coordinated multi-cell communications system. The CoMP system may include at least two multi-transmission/reception points and user terminals.

The multi-transmission/reception points may be i) a base station or ii) a macrocell (hereinafter referred to as an "eNB") and at least one RRH connected to the eNB via a fiber optic cable or an optical fiber and controlled by the eNB. The RRH has high transmission power, or has low transmission power within the area of the macrocell.

Hereinafter, the DL refers to communications from each multi-transmission/reception point to a UE or a path for such communications. The UL refers to communications from the UE to the multi-transmission/reception point or a path for such communications. In the DL, a transmitter may be a portion of the multi-transmission/reception point, and a receiver may be a portion of the UE. In the UL, the transmitter may be a portion of the UE, and the receiver may be a portion of the multi-transmission/reception point.

Hereinafter, transmitting/receiving a signal via a channel, such as the PUCCH, PUSCH, PDCCH, EPDCCH, or physical PDSCH, may be described as "transmitting/receiving a PUCCH, PUSCH, PDCCH, EPDCCH, or PDSCH."

In addition, hereinafter, transmitting or receiving a PDCCH or transmitting or receiving a signal on the PDCCH may refer to transmitting or receiving an EPDCCH or transmitting or receiving a signal on the EPDCCH.

That is, the PDCCH described hereinafter indicates the PDCCH or the EPDCCH, or is used in the sense of including both the PDCCH and the EPDCCH.

For convenience of description, the EPDCCH may be applied as an embodiment to the portion described as the PDCCH, and the PDCCH may be applied as an embodiment to the portion described as the EPDCCH.

In the meantime, higher layer signaling described hereinafter includes radio resource control (RRC) signaling to transmit RRC information including an RRC parameter.

The eNB performs DL transmission to UE devices. The eNB can transmit a physical downlink shared channel (PDSCH), which is a main channel for unicast transmissions, and a physical downlink control channel (PDCCH), on which downlink control information (DCI), such as scheduling necessary for the reception of the PDSCH, and scheduling approval information for transmissions on a UL data channel (e.g. a physical uplink shared channel (PUSCH)) are transmitted. Hereinafter, the transmission of a signal on each channel will be described as the transmission of the corresponding channel.

PUSCH Transmission Mode

In particular, a base station may set one of two types of transmission modes for enabling a typical LTE/LTE-Advanced user equipment (UE) to perform PUSCH transmissions. A DCI format for allocating PUSCH transmission resources is determined depending on the set transmission mode. Then, the UE performs blind decoding based on the set DCI format through a common search space and a UE-specific search space.

Although a bandwidth reduced low complexity/coverage enhancement (BL/CE) UE is defined to support a single transmission mode, the DCI format for allocating of each PUSCH transmission resource is determined depending on the CE mode of the corresponding UE. Thus, respective blind decoding is performed based on the DCI format established through a Type0-common search space or the UE-specific search space.

VoLTE

In the LTE/LTE-Advanced system, a semi-persistent scheduling (SPS) mechanism is defined to efficiently support real-time media, such as audio and video, which are sensitive to delays. Thus, to receive an SPS activation/deactivation-related DCI, an LTE/LTE-Advanced UE is defined as follows: a typical LTE/LTE-Advanced UE is defined to perform decoding based on a semi-persistent scheduling cell radio network temporary identifier (SPS C-RNTI) allocated for the corresponding UE in the common search space of a physical downlink control channel (PDCCH) or an enhanced physical downlink control channel (EPDCCH) or in the UE-specific search space. On the other hand, a BL/CE UE is defined to perform decoding based on an SPS C-RNTI allocated for the corresponding UE in the Type0-common search space (CEmodeA only) of M-PDCCH or the UE-specific search space.

TTI Bundling with Synchronous HARQ

In the LTE/LTE-Advanced system, as a hybrid automatic repeat request (HARQ) method for PUSCH, a synchronous non-adaptive HARQ operation is defined.

Thus, in the case of frequency division duplexing (FDD) (or when a PCell is FDD in the case in which carrier aggregation (CA) is established in the UE), a typical LTE/LTE-Advanced UE is defined to receive hybrid automatic repeat request acknowledgement/negative acknowledgement (HARQ-ACK/NACK) via a physical hybrid-ARQ indicator channel (PHICH) transmitted from a DL subframe, after four (4) subframes from a UL subframe in which a PUSCH transmission has been performed. When the NACK is received via the corresponding PHICH, PUSCH retransmission is performed using the same radio resources as in an initial PUSCH transmission in a UL subframe after four subframes from the reception of the NACK.

In the case of time division duplexing (TDD) (or when the PCell is FDD in the case in which CA is established in the UE), a synchronous non-adaptive HARQ operation method is the same as in the FDD. In contrast, in the UL/DL configuration of the corresponding TDD, the initial PUSCH transmission and an associated PHICH reception timing relationship, as well as a PHICH NACK and an associated retransmission timing relationship, is selected.

In the case of a coverage limited UE, transmission time interval (TTI) bundling is defined, in which a single HARQ entity is configured as a plurality of TTIs to improve the performance of the PUSCH that would otherwise be a coverage bottleneck, with TTI_BUNDLE_SIZE thereof being defined as 4. Here, a single UL transport block (TB) is transmitted through four UL subframes. Four HARQ entities are configured, each of which performs a synchronous non-adaptive HARQ operation.

Thus, ACK/NACK feedback via the PHICH with respect to the bundled PUSCH transmission is transmitted in a fourth DL subframe after the corresponding subframe, based on the last PUSCH transmission (i.e. the fourth subframe of the corresponding bundle). When the NACK is transmitted, retransmission of a PUSCH bundle is performed in and after a ninth DL subframe from the corresponding subframe.

In contrast, Release 12 has defined an operating method to reduce delays in the PUSCH bundling by considering the SPC, in which three HARQ processes are generated by excluding one HARQ entity when the corresponding PUSCH bundling is established. In this case, the timing gap between the PHICH NACK and the associated retransmission is reduced to five subframes.

In Release 12, as a coverage enhancement method for BL/CE UE, repetition is applied to the PUSCH. The number of repetitions of the corresponding PUSCH is determined, depending on the maximum number of repetitions of PUSCH transmissions, established by the CE mode and RRC signaling, and an established number of repetitions transmitted on the DCI. In the case of Release 13 BL/CE UE, asynchronous adaptive HARQ operations for the PUSCH are selected. In this regard, DCI format 6-0A and DCI format 6-0B, i.e. UL grant DCI formats newly defined for the corresponding Release 13 BL/CE UE, respectively include an information area for the allocation of HARQ process numbers.

Specific UE procedures related to a typical LTE/LTE-A UE and Release 13 BL/CE UE will be attached by extracting TS 36.213 specification of appendix [1].

Exemplary embodiments provide a PUSCH transmission mode establishing method for expanding transmission time interval (TTI) bundling that has been typically performed in the unit of four subframes, for PUSCH coverage enhancement of a typical LTE/LTE-Advanced UE (UE) established to receive DCIs via a physical downlink control channel (PDCCH) or an enhanced physical downlink control channel (EPDCCH), and a blind decoding method for the PDCCH/EPDCCH.

Scheme 1. New Transmission Mode Configuration

In addition to existing PUSCH transmission modes 1 and 2 for PUSCH coverage enhancement of a typical LTE/LTE-Advanced UE receiving DCIs via the PDCCH or EPDCCH, a new PUSCH transmission mode may be defined.

For example, transmission mode (TM) 0, a new PUSCH transmission mode for PUSCH coverage enhancement, may be defined. However, exemplary embodiments are not limited to the corresponding new transmission mode.

TM 0, the new PUSCH transmission mode for PUSCH coverage enhancement, may be established for each UE through UE-specific RRC signaling by the base station, like existing TM 1 and TM 2. Thus, in addition to DCI format 0 or DCI format 4, i.e. existing UL grant DCI formats for the allocation of PUSCH resources, new DCI format N for TM 0 may be defined.

Thus, when TM 0 is established for any LTE/LTE-Advanced UE, the following blind decoding behavior for UL grant reception may be defined to the corresponding UE.

FIG. 1 to FIG. 4 are diagrams for explaining blind decoding behavior in a method of transceiving data via a UL data channel (or PUSCH) for coverage enhancement according to embodiments.

Figure 1:
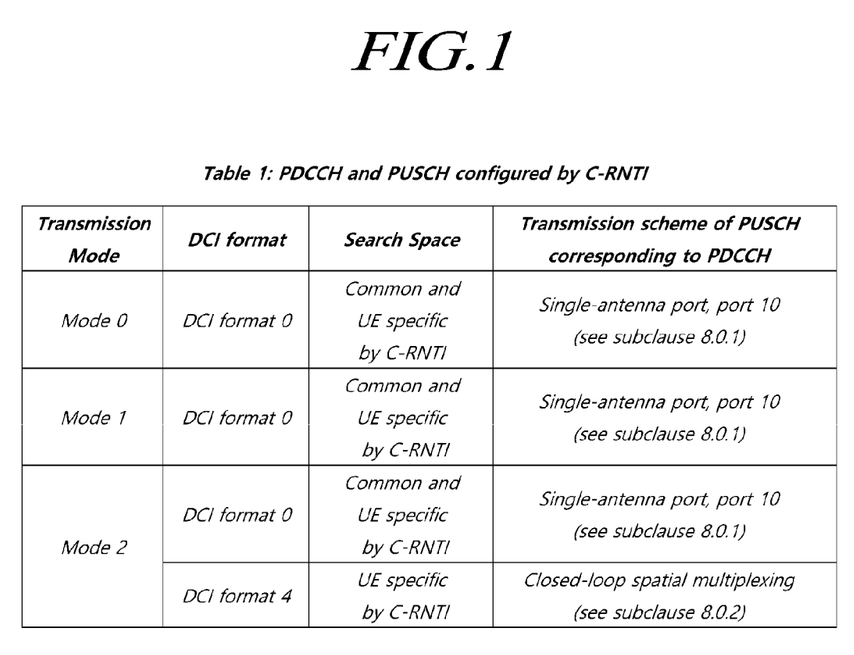
FIG. 1 to FIG. 4 are diagrams for explaining blind decoding behavior in a method of transceiving data via an uplink data channel for coverage enhancement according to embodiments.
Figure 2:
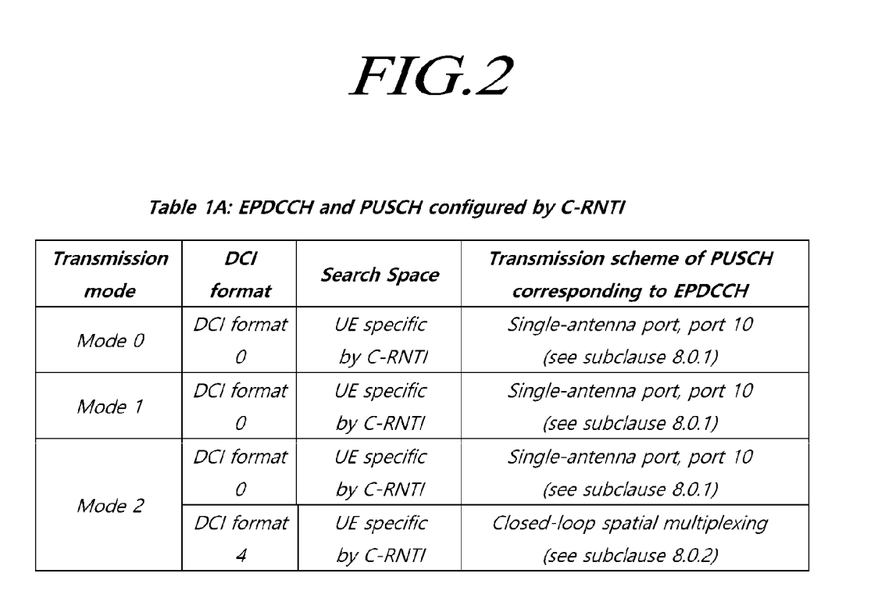

As a first embodiment of the blind decoding behavior for corresponding TM 0, in a C-RNTI-based blind decoding behavior, blind decoding based on a DCI format 0 is performed for a common search space of the PDCCH in the same manner as in the blind decoding behavior of a mode 1, as represented in Table 1 of FIG. 1. In addition, as represented in Table 1A of FIG. 2, the blind decoding behavior based on the DCI format 0 being performed for a UE-specific search space of the PDCCH or EPDCCH can be selected.

Figure 3:
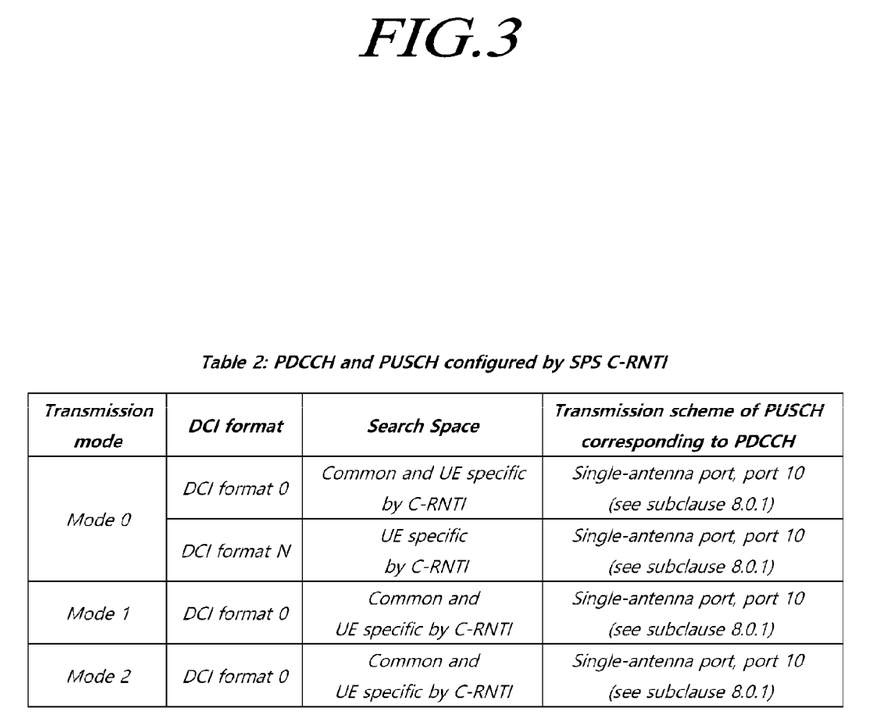
Figure 4:
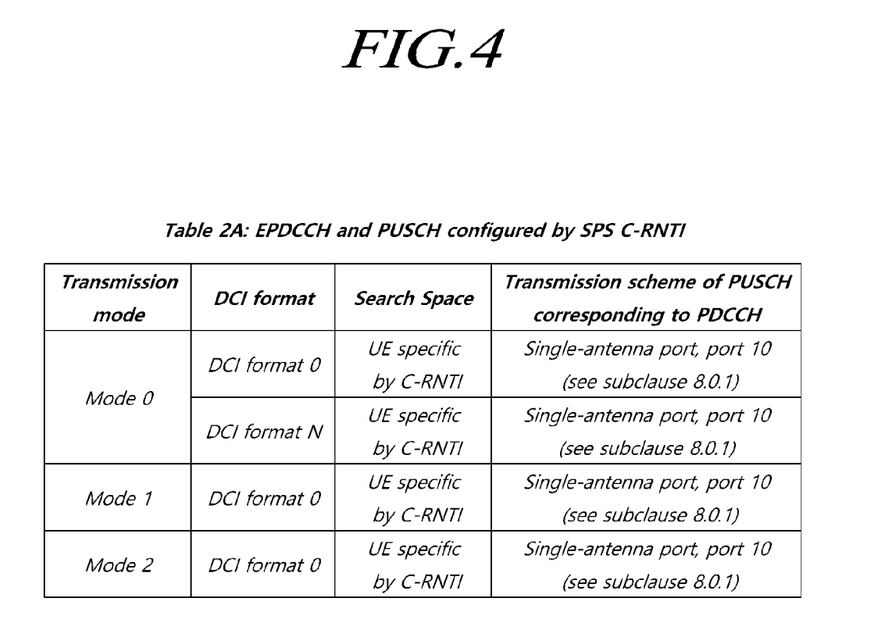

In contrast, a blind decoding behavior based on a new DCI format N, as represented in Table 2 of FIG. 3 and Table 2A of FIG. 4, can only be selected for an SPS C-RNTI-based blind decoding behavior.

That is, when a transmission mode is established as TM 0 for coverage enhancement, the C-RNTI-based blind decoding behavior is performed in the same manner as in the blind decoding behavior of mode 1, while the SPS C-RNTI-based blind decoding behavior is performed according to the blind decoding behavior based on the new DCI format N.

Figure 5:
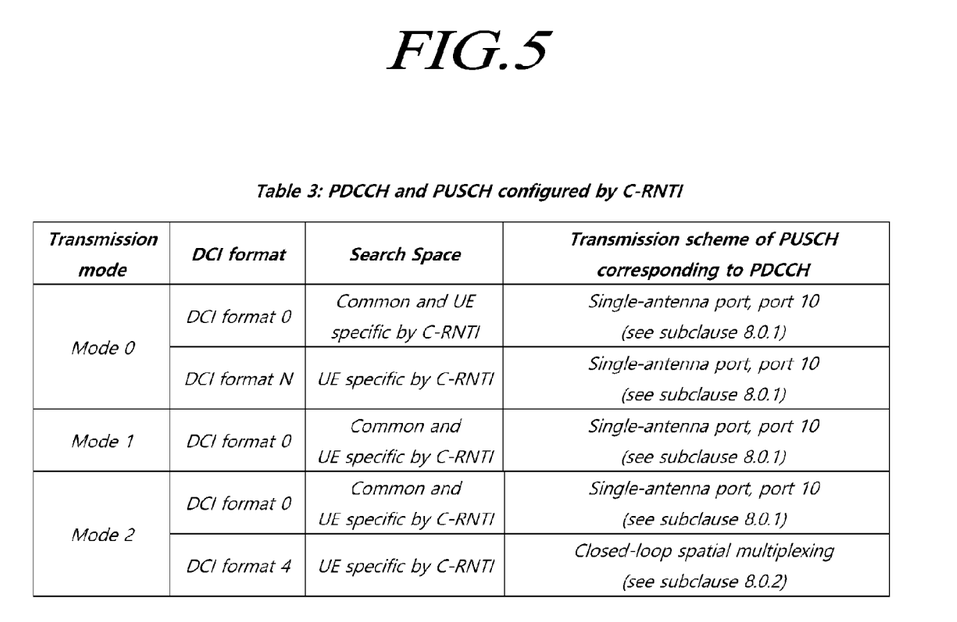
FIG. 5 and FIG. 6 are diagrams for explaining blind decoding behavior in a method of transceiving data via an uplink data channel for coverage enhancement according to another embodiment.
Figure 6:
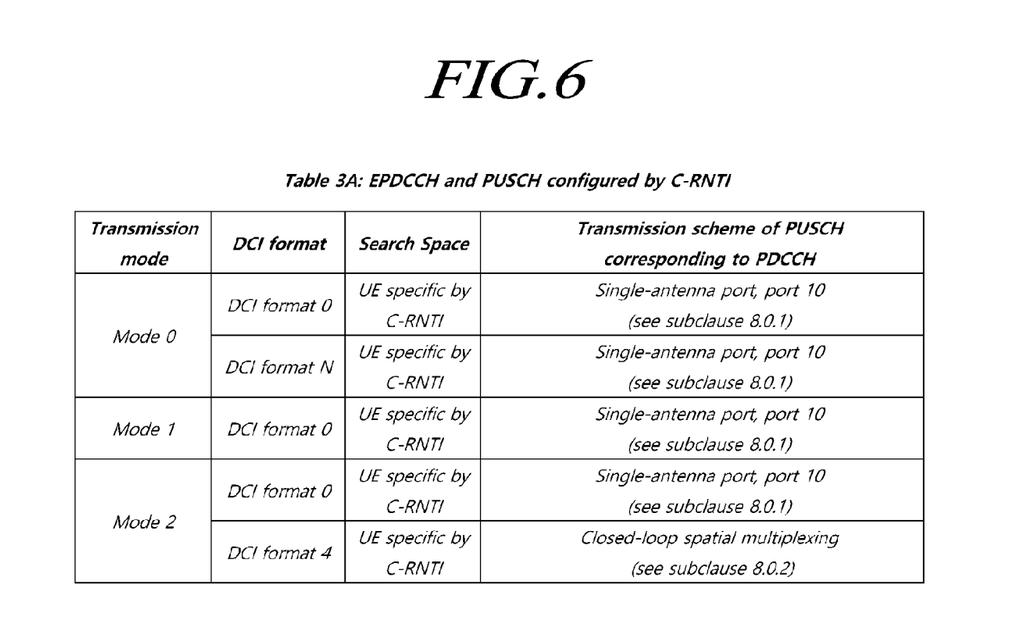

FIG. 5 and FIG. 6 illustrate another exemplary blind decoding behavior in a method of transceiving data via a UL data channel for coverage enhancement according to exemplary embodiments.

As another embodiment of the blind decoding behavior for corresponding TM 0, a C-RNTI-based blind decoding behavior can be selected such that blind decoding based on DCI format N is performed through the UE-specific search space of the PDCCH or EPDCCH, as represented in Table 3 of FIG. 5 and Table 3A of FIG. 6.

Even in this case, for the SPS C-RNTI-based blind decoding behavior, a blind decoding behavior based on the new DCI format N, as represented in Table 2 of FIG. 3 and Table 2A of FIG. 4, may be selected.

As a further another embodiment of the blind decoding behavior for corresponding TM 0, the two above-described blind decoding behaviors may be defined, such that blind decoding is only performed for DCI format N, instead of being performed for the DCI format 0, a fallback DCI format, in the UE-specific search space of the PDCCH or EPDCCH.

That is, the UE, the transmission mode of which is established as new TM 0, may only monitor the DCI format N for the UE, which is established as TM in the UE-specific search space of the PDCCH or EPDCCH, without monitoring the DCI format 0.

Even in this case, it may be defined such that the C-RNTI-based blind decoding follows the blind decoding behavior of existing TM1, the blind decoding based on the DCI format 0 is performed for the common search space of the PDCCH only for the SPS C-RNTI, and the blind decoding based on the DCI format N is performed for the UE specific search space of the PDCCH or EPDCCH.

Alternatively, like the SPS, the blind decoding behavior of C-RNTI may be defined such that blind decoding based on the DCI format 0 is performed for the common search space of the PDCCH and the blind decoding based on the DCI format N is performed for the UE specific search space of the PDCCH or EPDCCH.

In addition, the above-described DCI format N may be a DCI format 6-0A defined for Release 13 BL/CE UE or a new DCI format definable for FeMTC that is under discussion in Release 14. (The new DCI format definable may be, for example, a DCI format 7-0A, but the present disclosure is not limited thereto.)

Furthermore, the above-described DCI format N may be a modified version of a DCI format 6-0A or a modified version of a DCI format 7-0A, modified based on the corresponding DCI format 6-0A or DCI format 7-0A.

For example, although the corresponding DCI format N is configured to have the same information area as the DCI format 6-0A or DCI format 7-0A, the number of repetitions of PUSCH transmissions according to the established number of PUSCH repetitions may be defined to be different from the number of repetitions of PUSCH transmissions defined for Release 13 BL/CE UE or Release 14 FeMTC UE.

Alternatively, the corresponding DCI format N, based on the DCI format 0, may be defined in the form of modified DCI format 0 by additionally defining an information area for the allocation of HARQ process numbers or an information area for the establishment of numbers of repetitions.

However, the above-described method of configuring the DCI format N is merely an embodiment, and all cases in which the above-described blind decoding behavior based on TM 0 is applied regardless of the method of configuring the corresponding DCI format N can be embraced within the scope of the present disclosure.

Scheme 2. Variable TTI Bundle Size Configuration

As another method for PUSCH coverage enhancement, the base station may be defined to semi-statically establish TTI_BUNDLE_SIZE, defined as 4, through UE-specific or cell-specific RRC signaling. In this case, when there is no newly established value depending on additional establishment of corresponding TTI_BUNDLE_SIZE, the UE established to perform TTI bundling performs TTI bundling based on a default value (=4). When there is a newly established value, the UE performs TTI bundling based on the newly established value.

Figure 7:
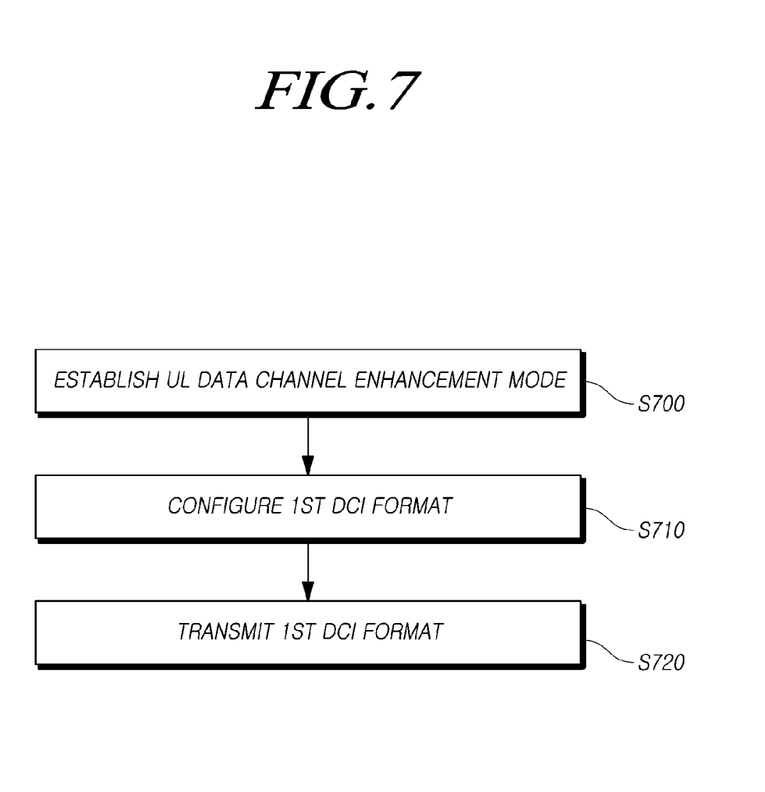
FIG. 7 and FIG. 8 are flowcharts illustrating a method of transceiving data via an uplink channel according to an embodiment.
Figure 8:
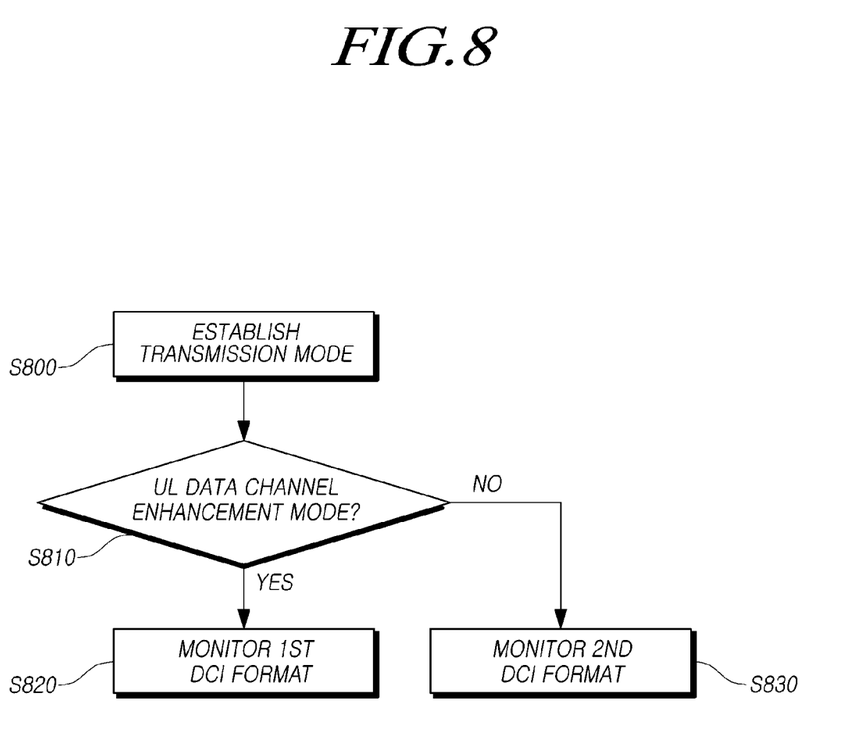

FIG. 7 and FIG. 8 illustrate operations of transceiving data via a UL channel according to exemplary embodiments.

FIG. 7 is a flowchart for explaining a method of a base station for transceiving data via a UL channel for coverage enhancement according to exemplary embodiments.

Referring to FIG. 7, in S700, the base station according to exemplary embodiments establishes (e.g., sets) a new transmission mode for PUSCH coverage enhancement of LTE/LTE-Advanced UE.

The new transmission mode for PUSCH coverage enhancement of the LTE/LTE-Advanced UE may be an additionally defined transmission mode separately from existing PUSCH transmission modes 1 and 2. For example, the new transmission mode may be defined as transmission mode 0, but the present disclosure is not limited thereto.

The base station can set the new PUSCH transmission mode TM0, for each UE by performing UE-specific RRC signaling, like existing TM 1 and TM 2.

In S710, the base station configures a first DCI format for allocating PUSCH resources to the UE set with the new PUSCH transmission mode TM 0.

The first DCI format is a DCI format for allocating PUSCH resources to the UE set with the new transmission mode TM 0. The first DCI format may be a new DCI format defined separately from existing DCI formats. For example, the first DCI format may be a DCI format N. Alternatively, the first DCI format may be a DCI format modified based on an existing DCI format. That is, the first DCI format may be defined additionally with an information area for allocating a HARQ process number or with an information area for setting a repetition number. For example, the DCI format may be a DCI format 0C.

In S720, the base station transmits the first DCI format to the UE for allowing the UE for PUSCH coverage enhancement to perform blind decoding based on TM 0. As described, the first DCI format is the new transmission mode TM0 for allocating PUSCH resources for the UE for coverage enhancement.

FIG. 8 is a flowchart for explaining a method of a UE for transceiving data via a UL channel for coverage enhancement according to exemplary embodiments.

Referring to FIG. 8, in S800, the UE according to exemplary embodiments establishes (e.g., sets) a transmission mode for PUSCH transmissions.

The PUSCH transmission mode of the UE may be set through UE-specific RRC signaling by the base station.

The PUSCH transmission mode of the UE may be a transmission mode (e.g. a typical mode, such as TM 1 or 2) for a typical LTE/LTE-Advanced UE or may be a new transmission mode (e.g. an enhancement mode, such as TM 0) for coverage enhanced LTE/LTE-Advanced UE.

When the transmission mode of the UE is the new transmission mode TM 0 for PUSCH coverage enhancement, the UE performs monitoring to a first DCI format via a DL control channel in S820.

The first DCI format is a DCI format for the allocation of PUSCH resources for the UE set with the new transmission mode TM 0. The first DCI format may be a DCI format defined separately from existing DCI formats. For example, the first DCI format may be a DCI format N. Alternatively, the first DCI format may be a DCI format modified based on an existing DCI format. Such a first DCI format may be defined based on an information area for allocating a HARQ process number or an information area for setting a repetition number.

When the transmission mode of the UE is a typical transmission mode, the UE performs monitoring to a second DCI format via a downlink control channel in S830.

Specifically, when the transmission mode of the UE is a new transmission TM 0 defined for PUSCH coverage enhancement, in a UE-specific search space, the UE performs blind decoding only for the first DCI format, e.g. a DCI format N or a DCI format 0C, without performing blind decoding to the second DCI format, e.g. a DCI format 0, which is a fallback DCI format.

Therefore, according to exemplary embodiments, the PUSCH coverage of the UE may be improved by defining a new transmission mode for a typical LTE/LTE-Advanced UE and providing a specific blind decoding behavior of UE.

Figure 9:
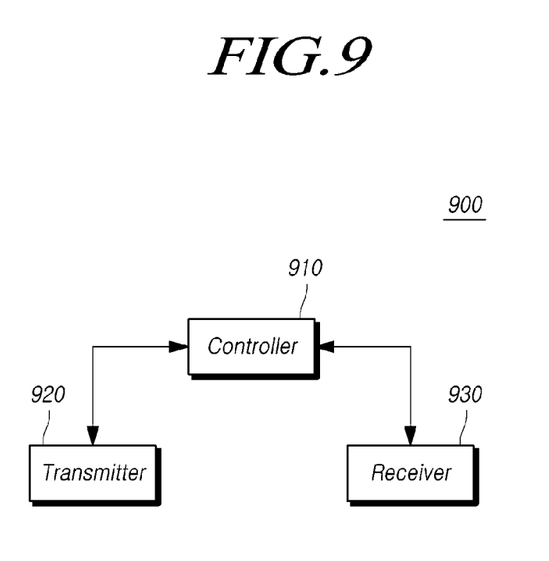
FIG. 9 is a block diagram illustrating a base station according to an embodiment.

FIG. 9 is a block diagram illustrating the base station 900 according to exemplary embodiments.

Referring to FIG. 9, the base station 900 according to exemplary embodiments includes a controller 910, a transmitter 920, and a receiver 930.

The controller 910 controls the overall operations of the base station 900, required for setting a new PUSCH transmission mode for PUSCH coverage enhancement and performing a blind decoding behavior, according to exemplary embodiments as described above.

The transmitter 920 and the receiver 930 transmit and receive signals, messages, and data, required for realization of above-described exemplary embodiments, to and from UE.

Figure 10:
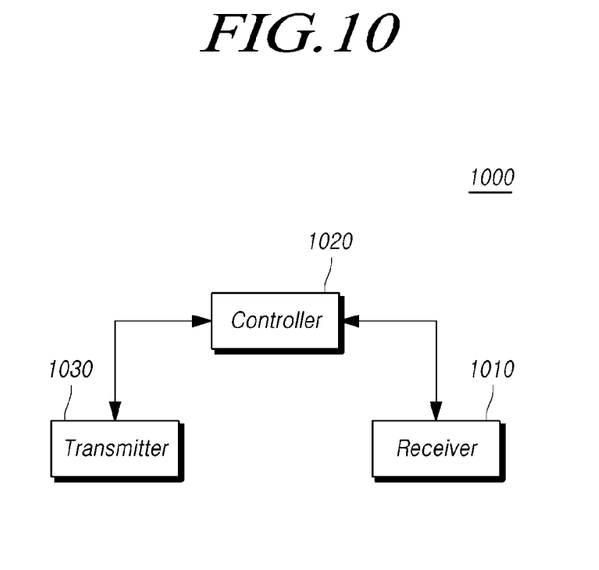
FIG. 10 is a block diagram illustrating a user equipment according to an embodiment.

FIG. 10 is a block diagram illustrating the UE 1000 according to exemplary embodiments.

Referring to FIG. 10, the UE 1000 according to exemplary embodiments includes a receiver 1010, a controller 1020, and a transmitter 1030.

The receiver 1010 receives DCI, data, and message from the base station via a corresponding channel.

The controller 1020 controls the overall operations of the UE 1000, required for establishing a new PUSCH transmission mode for PUSCH coverage enhancement and performing blind decoding, according to exemplary embodiments as described above.

The transmitter 1030 transmits uplink control information (UCI), data, and messages to the base station via a corresponding channel.

The standard contents or standard documents mentioned in the foregoing embodiments are omitted to simplify the description of the specification and shall be understood to be incorporated herein. Therefore, portions of the standard contents or the standard documents, added to the specification or described in the appended Claims, should be interpreted as falling within the scope of the present disclosure.

The foregoing descriptions and the accompanying drawings have been presented in order to explain the certain principles of the present disclosure. A person skilled in the art to which the present disclosure relates can make many modifications and variations by combining, dividing, substituting for, or changing the elements without departing from the principle of the present disclosure. The foregoing embodiments disclosed herein shall be interpreted as illustrative only but not as limitative of the principle and scope of the present disclosure. It should be understood that the scope of the present disclosure shall be defined by the appended Claims and all of their equivalents fall within the scope of the present disclosure.

What is claimed is:

1. A method of transceiving data via an uplink data channel for coverage expansion, the method comprising:
    establishing, by a base station, a transmission mode of a user equipment as an uplink data channel enhancement transmission mode for uplink data channel coverage enhancement of the user equipment;
    configuring a first downlink control information (DCI) format for the user equipment set with the uplink data channel enhancement transmission mode; and
    transmitting the first DCI format via a downlink control channel,
    wherein the first DCI format is a DCI format for the uplink data channel enhancement transmission mode for allocating uplink shared channel resources for the user equipment, and the first DCI format includes information for allocating a hybrid automatic repeat request (HARD) process number and information for setting a repetition number, and
    wherein when a transmission mode of the user equipment is the uplink data channel enhancement transmission mode, the user equipment monitors the first DCI format in a specific search space without monitoring a second DCI format, wherein the second DCI format is a DCI format for a user equipment configured for an uplink data channel normal transmission mode.

2. The method according to claim 1, wherein the uplink data channel enhancement transmission mode is established through specific higher layer signaling of the user equipment.

3. The method according to claim 1, wherein the specific search space of the user equipment is a UE specific search space, and the user equipment decodes the first DCI formation in the UE specific search space without decoding a second DCI format.

4. The method according to claim 3, wherein the first DCI format is configured by modifying the second DCI format to additionally include an HARQ process number and a repetition number.

5. A method of transceiving data via an uplink data channel for coverage expansion, the method comprising:
    establishing a transmission mode for transmitting an uplink data channel;
    when the transmission mode is an uplink data channel enhancement transmission mode, monitoring a downlink control channel to receive a first downlink control information (DCI) format, and when the transmission mode is an uplink data channel normal mode, monitoring the downlink control channel to receive a second DCI format; and
    receiving one of the first DCI format and the second DCI format via the downlink control channel,
    wherein the first DCI format is a DCI format for the uplink data channel enhancement transmission mode for allocating uplink shared channel resources for the user equipment, and the first DCI format includes information for allocating a hybrid automatic repeat request (HARQ) process number and information for setting a repetition number, and
    when a transmission mode of the user equipment is the uplink data channel enhancement transmission mode, the user equipment monitors the first DCI format in a specific search space without monitoring a second DCI format, wherein the second DCI format is a DCI format for a user equipment configured for an uplink data channel normal transmission mode.

6. The method according to claim 5, wherein the uplink data channel enhancement transmission mode is established by specific higher layer signaling of a user equipment.

7. The method according to claim 5, wherein the specific search space of the user equipment is a UE specific search space, and the user equipment decodes the first DCI formation in the UE specific search space without decoding a second DCI format.

8. The method according to claim 7, wherein the first DCI format is configured by modifying the second DCI format to include a hybrid automatic repeat request (HARQ) process number and a repetition number.

9. A base station for transceiving data via an uplink data channel for coverage expansion, comprising:
    a controller configured to establish an uplink data channel enhancement transmission mode for uplink data channel coverage enhancement of a user equipment and configures a first downlink control information (DCI) format for the user equipment set with the uplink data channel enhancement transmission mode; and
    a transmitter configured to transmit the first DCI format via a downlink control channel,
    wherein the first DCI format is a DCI format for the uplink data channel enhancement transmission mode for allocating uplink shared channel resources for the user equipment, and the first DCI format includes information for allocating a hybrid automatic repeat request (HARQ) process number and information for setting a repetition number, and
    when a transmission mode of the user equipment is the uplink data channel enhancement transmission mode, the user equipment monitors the first DCI format in a specific search space without monitoring a second DCI format, wherein the second DCI format is a DCI format for a user equipment configured for an uplink data channel normal transmission mode.

10. The base station according to claim 9, wherein the uplink data channel enhancement transmission mode is established by specific higher layer signaling of the user equipment.

11. The base station according to claim 9, wherein the specific search space of the user equipment is a UE specific search space, and the user equipment decodes the first DCI format in the UE specific search space without decoding a second DCI format.

12. The base station according to claim 11, wherein the first DCI format is configured by adding a hybrid automatic repeat request (HARD) process number and a repetition number to the second DCI format.

* * * * *

UNITED STATES PATENT AND TRADEMARK OFFICE
CERTIFICATE OF CORRECTION

PATENT NO. : 10,581,560 B2  
APPLICATION NO. : 15/716568  
DATED : March 3, 2020  
INVENTOR(S) : Kyujin Park et al.

Page 1 of 1

It is certified that error appears in the above-identified patent and that said Letters Patent is hereby corrected as shown below:

In the Claims

In Claim 1, Column 11, Line 28, please replace "(HARD)" with --(HARQ)--;

In Claim 12, Column 12, Line 62, please replace "(HARD)" with --(HARQ)--.

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*